XR 3,034,707

May 15, 1962 H. JEFFERSON 3,034,707

BROADCASTING SYSTEMS

Filed March 13, 1958 5 Sheets-Sheet 1

INVENTOR
Harold Jefferson
BY Richard [illegible]
Ag't

INVENTOR
Harold Jefferson
BY Richard [illegible]
Ag't

INVENTOR
Harold Jefferson
BY Richard ... Agt

INVENTOR
Harold Jefferson
BY Richard [illegible]
Ag't

May 15, 1962 H. JEFFERSON 3,034,707

BROADCASTING SYSTEMS

Filed March 13, 1958 5 Sheets-Sheet 5

INVENTOR
Harold Jefferson
BY Richard Lord
Ag't

United States Patent Office 3,034,707
Patented May 15, 1962

3,034,707

BROADCASTING SYSTEMS

Harold Jefferson, London, England, assignor to Communications Patents Limited

Filed Mar. 13, 1958, Ser. No. 721,240
Claims priority, application Great Britain Mar. 18, 1957
10 Claims. (Cl. 235—52)

Figure 1:
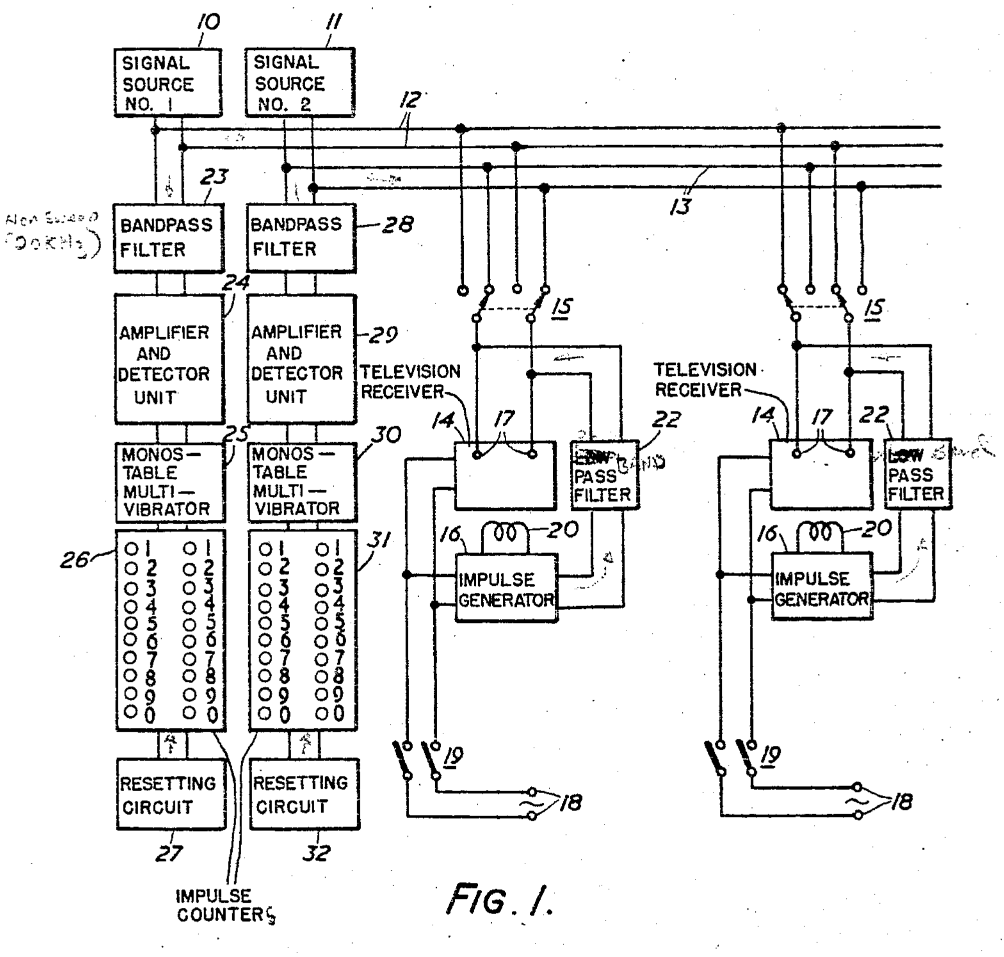

This invention is concerned with television or other broadcasting systems, including both radio and wired broadcasting systems.

The adoption of broadcasting for advertising purposes makes it desirable to obtain a reasonably accurate indication of programme popularity. Advantageously such an indication should be registered in a continuous manner which is capable of being analysed directly in a simple, convenient and economical way without delay. Preferably the indications should be such that an advertiser, if he so wishes, may observe the measurement of programme popularity simultaneously with the presentation of programme matter in which he is interested.

An object of this invention is the provision of improved arrangements whereby there is presented at a central station an indication of how many of a group of remotely situated receiving equipments are being used at any one time to receive a particular broadcast transmission.

Another object of this invention is to provide improved arrangements whereby there is obtained in respect of a group of receiving equipments an indication as to how many of these equipments are being used at a given time to receive any one of a number of different broadcast transmissions.

A further object of this invention is to provide improved arrangements whereby an indication can be presented at one or more locations of the number of persons receiving a particular broadcast transmission by way of a certain group of receiving equipments.

According to one broad aspect of the invention, a broadcasting system comprises a group of receiving equipments, a separate signal-generating means provided in association with each such equipment and serving to generate an electric signal which is representative of information pertaining to this specific equipment, a remotely situated indicating apparatus which is responsive to the number of such electric signals applied thereto, and a signal-transmitting channel between said indicating apparatus and each of the signal-generating means whereby the electric signals are conveyed to said apparatus and the latter serves to present an indication which is representative of such information in respect of the whole group of receiving equipments.

According to another broad aspect of the invention, a broadcasting system comprises a group of receiving equipments, a separate signal-generating means provided in association with each such equipment and serving to generate within a predetermined unit of time an electric signal which is representative of information pertaining to this specific equipment, an indicating apparatus which is responsive to the number of such electric signals applied thereto, a signal transmitting channel between each of the signal-generating means and said indicating apparatus whereby such electric signals in respect of the whole group of receiving equipments are applied to the indicating apparatus so that the latter presents an indication which is representative of such information in respect of the whole group of receiving equipments during such predetermined unit of time.

According to a further broad aspect of the invention, a broadcasting system comprises a group of receiving equipments, a separate signal-generating means provided in association with each such equipment, a control means enabling said generating means to be put into operation at random to generate a succession of electric signals which occur at substantially regular intervals and are representative of information pertaining to this specific receiving equipment, each of said signals being of short duration in comparison with the interval of time between successive signals, a remotely situated indicating apparatus which is responsive to the number of such electric signals it receives within such an interval of time, and a signal-transmitting channel between each of the signal-generating means and said indicating apparatus for conveying the periodic electric signals to said apparatus, whereby the latter serves to present an indication which is representative of such information in respect of the whole group of receiving equipments.

In general, the signal-generating means provided in association with each of the receiving equipments will be arranged under the control of a personally-operable switching means which forms an associated part of the equipment and is capable of being set into different switching conditions by a user of this specific equipment. Thus in preferred embodiments of the invention such a personally-operable switching means serves to control the signal-generating means in a manner such that the electric signal generated thereby is indicative of, for example, the fact that the receiving equipment is in use, the receiving equipment is operating in respect of a particular broadcast transmission, and/or the number of persons accepting a particular broadcast transmission through the intermediary of the group of receiving equipments.

The signal-transmitting channel between an indicating apparatus and a signal-generating means can in some cases be formed by a channel which is reserved for this purpose. For example, in the case of a radio broadcasting system, such a channel can be formed by a telephone line which is established between the location of a receiving equipment and the location of the indicating apparatus. In the case of a wired broadcasting system, the signal-transmitting channel between an indicating apparatus and the signal-generating means can comprise a signal-distributing line of the wire network of the system.

In some embodiments of the invention a separate indicating apparatus is provided in respect of each item of information it is required to indicate but in other embodiments a single indicating apparatus is used, on a time sharing basis, to provide an indication of each of a plurality of items of information in turn.

Figure 2:
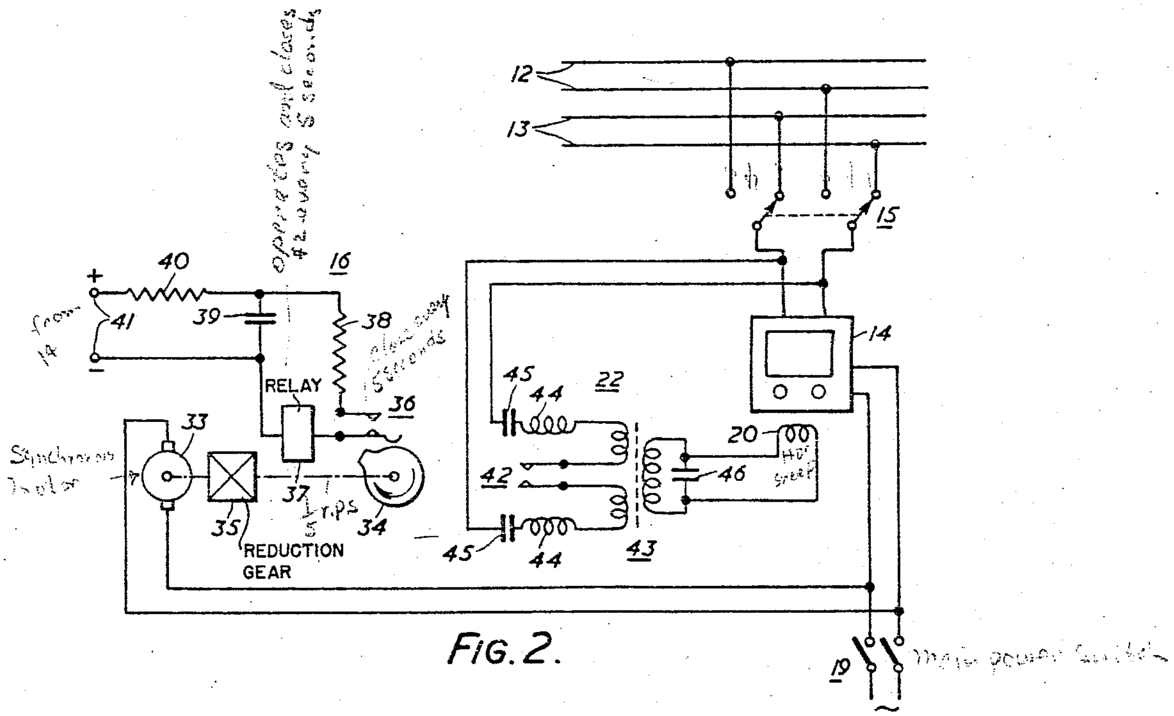
Figure 3:
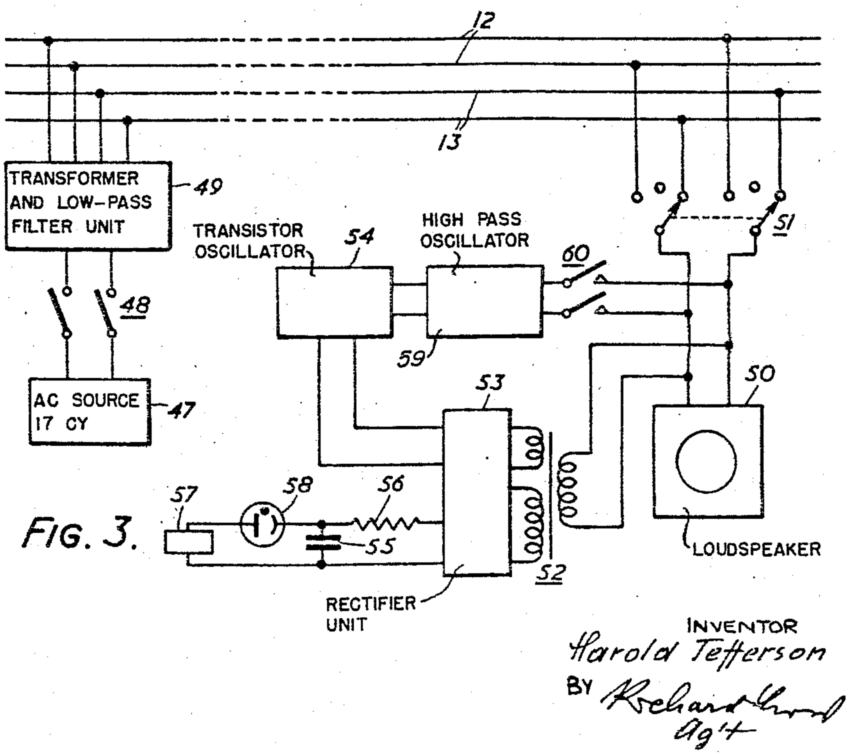
Figure 4:
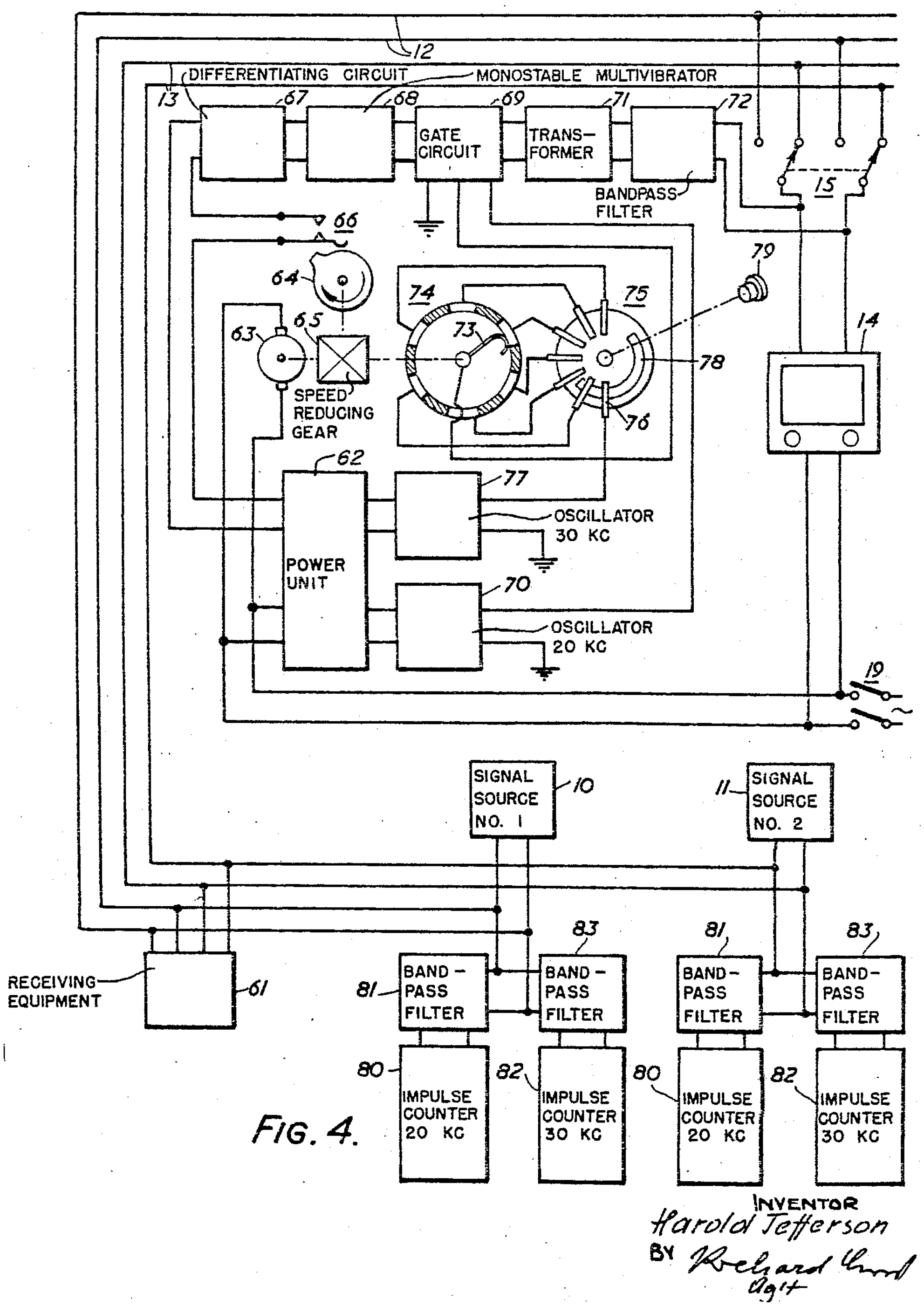
Figure 5:
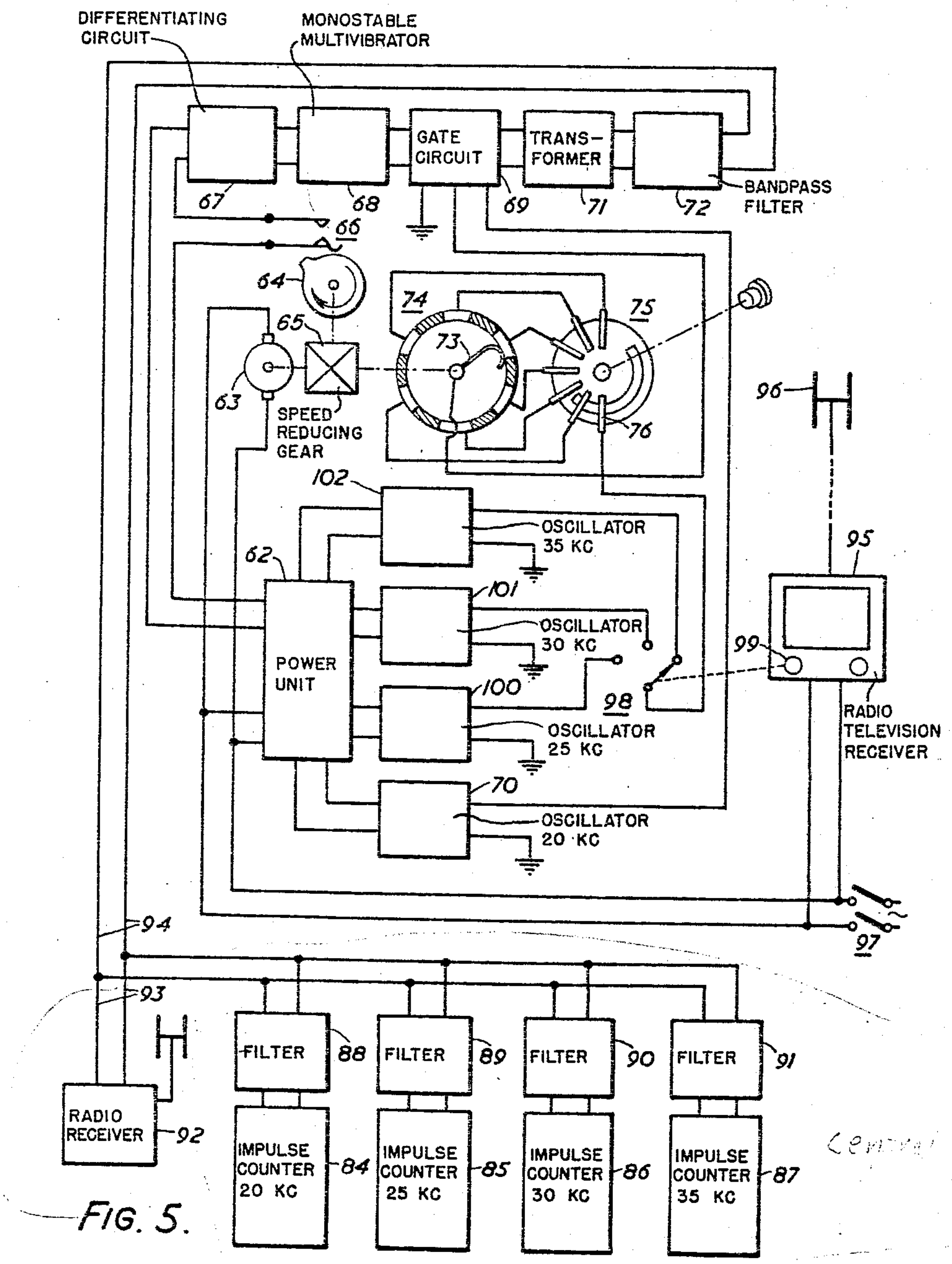
Figure 6:
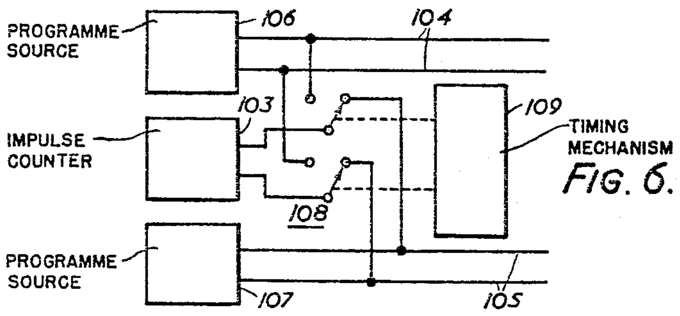
Figure 7:
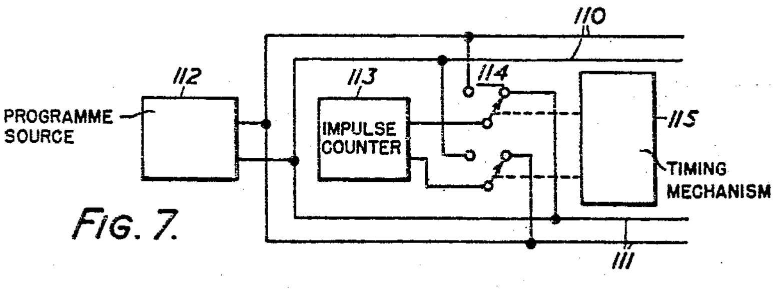
Figure 8:
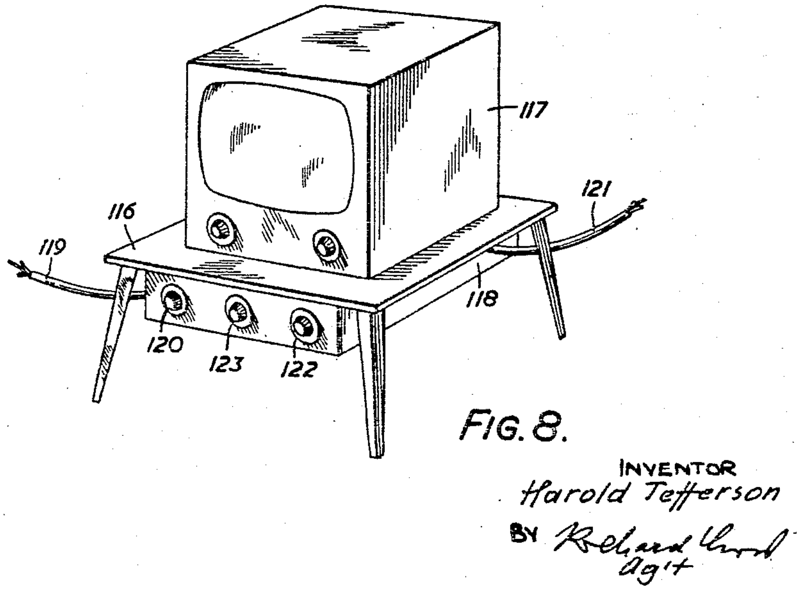

In order that the invention more readily can be understood, it will now be described with reference to the accompanying drawings which show, merely by way of example, several different embodiments of the invention. In these drawings:

FIG. 1 shows, in diagrammatic manner, a wired broadcasting system according to one embodiment of the invention, FIG. 2 shows, in similar manner but in greater detail, the associated parts of a receiving equipment of the system shown in FIG. 1, FIG. 3, shows, in similar manner, a modified arrangement of the associated parts of a receiving equipment for a system similar to that of FIG. 1, FIG. 4 shows, in a diagrammatic manner, a wired broadcasting system according to another embodiment of the invention, FIG. 5 shows, in similar manner, a radio broadcasting system according to a further embodiment of the invention, FIG. 6 shows, in similar manner, one arrangement for using a common indicating apparatus in respect of different items of information, FIG. 7 shows, in similar manner, another arrangement for using a common indicating apparatus in respect of different items of information, and FIG. 8 shows a perspective view of a typical receiving equipment of a broadcasting system according to the invention.

The wired broadcasting system shown in FIG. 1 pertains to the distribution of two different programmes, for example, two television programmes and provides facilities for establishing at a central station of the system an indication which is representative of the number of a group of receiving equipments which are being used to receive each of these two programmes; that is to say an indication which is representative of the popularity of these two programmes. In general, a wired broadcasting system includes a wire or equivalent conductor network comprising one or more signal-distributing lines extending between a central station equipment, which includes one or more sources of programme signals, and a remote group of receiving equipments, these receiving equipments being located at the premises of subscribers to the service provided by the system. Thus in the example shown in FIG. 1, the central station equipment comprises signal sources 10 and 11 pertaining to different programmes which are to be broadcast through the intermediary of the network. For example, these two sources can provide high frequency carrier waves which are modulated with signals pertaining to different television programmes and are applied to separate signal-distributing lines 12 and 13 respectively.

Only two receiving equipments of this system are shown in FIG. 1 and each of these comprises a television receiver 14, a personally-operable switch 15 and a signal-generating means 16. Input terminals 17 of the receiver 14 are adapted to be connected to either one of the lines 12 and 13 alternatively through the intermediary of the switch 15 and at the will of the person using the equipment, said switch 15 thus serving to select either one at will of the two television programmes emanating from the sources 10 and 11.

A main power supply for the receiver 14 is obtained by way of terminals 18 and a further personally-operable switch 19. The latter also controls the supply of energising power to the signal-generating means 16 so that the latter is only permitted to operate when the receiver is "on."

The signal-generating means 16 is adapted to generate an electric signal—the popularity signal—which is representative of information pertaining to the specific receiving equipment, namely and in this example a signal which is representative of the fact that the receiver 14 is "on." Although it is possible to choose any one of several different forms of electric signal for use as the popularity signal in carrying out the invention, in general, each such signal will be in the form of an impulse (or in some cases a plurality of impulses) and can with advantage be an impulse of high frequency electric wave energy. Conveniently a supply of suitable high frequency energy is readily available from a television receiver, such as 14, by establishing an appropriate coupling, for example by a coil unit 20, between the line timebase circuit of the receiver and the signal-generating means 16. Alternatively, the required high frequency energy can be obtained from an independent source such for example as a high frequency oscillator. Further details of how the signal-generating means 16 produces a suitable signal will be given hereinafter but at this stage in the description it is sufficient to know that the output of the generating means 16 is a 1 millisecond impulse of a substantially 20 kc./s. wave every five seconds and that the generation of these periodic signals commences at random by virtue of the fact that the main power control switch 19 is operable at the will of the user of the equipment. The signal obtained from the output circuit of the generating means 16 is applied between the poles of the switch 15 through a filter 22 which serves to isolate the generating means so that the latter does not impose a load upon the television signal circuit. Thus it will be seen that when a receiver 14 is in the "on" condition, a 1 millisecond high frequency impulse which is specific to this receiver will be applied every five seconds to one or the other of the lines 12 and 13 according to which television programme is being received and that these popularity signals will be conveyed to the remote central station by the signal-transmitting channel formed by the particular line.

Because of the random nature of the starting of the generation of the popularity signals, each receiving equipment being under the individual control of its user, it has been found in practice that at least one hundred such receiving equipments can be included in a group, for the purpose of observation in respect of programme popularity, with reasonable certainty that a well-defined popularity signal will be made available on the lines in respect of each equipment. In fact, as the popularity signal is of short duration (1 millisecond) in comparison with the interval (5 seconds) between successive signals, the chance of the popularity signals from two equipments overlapping in this predetermined interval is very remote.

The central station equipment includes two separate indicating apparatus, one in respect of each of the two programmes. One such equipment is connected through a bandpass filter 23 to the line 12, this filter being designed to isolate the indicating apparatus from the television signals whilst allowing the 20 kc./s. popularity signals to pass to an amplifier and detector unit 24 of the apparatus. This unit accepts each of the 20 kc./s. popularity signals from the filter 23 and produces therefrom an impulse for triggering a monostable multivibrator 25 which then produces an impulse suitable for application to a two-decade impulse counting unit 26. The latter includes a clockwork controlled resetting circuit 27 which functions to reset the counting unit 26 to "zero reading" at 5 second intervals. A suitable form of counting unit has been described by Woodbury and Holdham (Radiation Laboratory Series, volume 19, page 611).

A corresponding indicating apparatus in respect of the other television programme is connected to the line 13 by way of a suitable bandpass filter 28 and comprises, in like manner, an amplifier and detector unit 29, multivibrator 30, impulse counting unit 31 and a resetting circuit 32.

The counting units 26 and 31 provide a visual indication of the number of popularity signals being received from each line in each of the predetermined 5 second units of time and hence a substantially continuous indication of the number of receiving equipments which are being used during this unit of time to receive the respective programmes, this information being displayed simultaneously with the presentation of the programmes.

If a record is required of these indications it is quite easy to arrange for each of the impulse counting units to control the magnitude of a voltage which is representative of the count and to use this voltage to operate a recording meter of any desired suitable type. Furthermore, it also will be appreciated that it is a comparatively simple matter to establish corresponding indications or records at one or more locations other than the central station, for example at the premises of advertisers who are interested in a particular programme.

Reference will now be made to FIGURE 2 which shows in greater detail the associated parts of the kind of receiving equipment shown in FIGURE 1 and comprising, as already described with reference to the latter figure, a television receiver 14, a personally-operable switch 15 for connecting this receiver to either of the two lines 12 and 13, a main power switch 19, a filter 22 and a signal-generating means 16. The latter includes a synchronous electric motor 33 which is arranged to be energised from a main power supply under the control of the switch 19 and to drive a switch-actuating cam 34 through a reduction gearing 35 so that said cam is made to close a pair of contacts 36 once every 5 seconds. The closing of these contacts 36 serves to connect the winding of a relay 37 and a resistor 38 across a capacitor 39 which is connected by way of a resistor 40 between terminals 41 of a suitable D.C. voltage source, for example a D.C. voltage present in the receiver 14.

Contacts 42 of the relay 37 are included between the two sections of a split secondary winding of a transformer 43, a primary of which is included in a circuit comprising the coupling coil 20 which, as hereinbefore mentioned with reference to FIGURE 1, serves to extract a high frequency wave (of the order of 20 kc./s.) from the line timebase circuit of the receiver 14. Each section of said secondary winding is connected through an inductance 44 and a capacitor 45 with a separate one of the poles of the switch 15 which enables the input circuit to the receiver 14 to be connected across either of the lines 12 and 13. The primary winding of the transformer 43 has a capacitor 46 thereacross and this, together with the transformer windings the inductance 44 and capacitors 45 have such values and are so arranged as to constitute a bandpass filter, the central frequency of which is around 20 kc./s.

When, at random, a person closes the mains switch 19 to bring the receiving equipment into use, the motor 33 will commence to rotate the cam 34 and, for as long as said switch remains closed, the contacts 36 will be closed once in every 5 seconds. Whilst the contacts 36 are open the capacitor 39 is receiving a charge which is sufficient to ensure that each time said contacts are closed by the cam there is a definite but brief operation of the relay 37 and a consequent closing of the relay contacts 42 for a period of about 1 millisecond. This closure of contacts 42 connects together the secondary windings of the transformer 43 with the result that the required 1 millisecond impulse of the 20 kc./s. wave, obtained by way of the coupling coil 20, is fed to the poles of the switch 15 and, for the shown setting of the switch, will be applied to the line 13 for transmission, as a popularity signal, to the indicating apparatus at the central station.

Although the particular broadcasting system forming the subject of FIGURES 1 and 2 has been described as being specific to television programmes, it is to be understood that in other embodiments sound programmes only might be transmitted and if the transmission is made at audio frequencies—so that a loud speaker is all that is required for reproducing the signals—there might be occasions when for one reason or another it is either impossible or undesirable to employ an electric mains power supply for energising any part of a subscriber's receiving equipment. In these circumstances the signal-generating means can be energised by a comparatively low power electric signal which is made available on the wired broadcasting network. One such arrangement is shown in FIGURE 3 which, like that of FIGURE 1, comprises a pair of lines 12 and 13 but in this case these lines serve to distribute audio frequency signals in respect of different sound programmes. A further difference between the arrangement of that of FIGURE 1 and this modified arrangement is that the central station equipment includes a source 47 of 17 c./s. alternating current which, under the control of a switch 48 and by way of a suitable transformer and low-pass filter unit 49, makes this very low frequency alternating current available in each of the two lines 12 and 13. A subscriber's receiving equipment for this system comprises a loudspeaker 50 and a programme selecting switch 51 which can be set to connect the input circuit of this loudspeaker to either of the lines 12 and 13 for reception of the respective programmes or to an intermediate "off" position. The means for generating a suitable popularity signal includes a transformer 52 which has its primary winding connected between the two poles of the switch 51 so that when the loudspeaker is in use there is present across each of the two secondary windings of this transformer a 17 c./s. voltage for application to a rectifying and smoothting unit 53. One of said secondary windings is in respect of a low voltage (12 volts) and the other secondary winding is in respect of a comparatively high voltage (150 volts) so that the unit 53 produces two D.C. outputs, one at the low voltage to energise a transistor oscillator 54 and the other at the high voltage for operating a pulsing circuit. This pulsing circuit comprises a capacitor 55 which is arranged to be charged by the high voltage D.C. output through a resistor 56. The winding of a relay 57 in series with a neon tube 58 is connected across the capacitor 55 to form a circuit which results in the relay being operated whenever the charge in the capacitor reaches a voltage which causes the neon to conduct and discharge the capacitor through the relay winding. The frequency of operation of the relay is primarily dependent upon the time constant of the capacitor (53) and resistor (56) combination and can, for example, be once every 5 seconds.

The transistor oscillator 54 provides an output having a frequency of the order of 20 kc./s. and this is applied, through a high pass filter 59 to contacts 60 of the relay 57. Every time said relay is operated these contacts 60 close for a period of 1 millisecond to apply an impulse of the 20 kc./s. wave between the poles of the switch 51 and hence to the line to which the loudspeaker is connected at this time. There is thus obtained from this signal-generating means the required succession of popularity signals for transmission to and the control of the indicating apparatus at the central station of the system.

In some circumstances it is desirable to provide an indication of information other than or in addition to the number of receiving equipments being used to receive a particular transmission and for this purpose a popularity signal can be varied in any desired suitable way for the purpose of conveying additional information. For example, a basic signal can be modulated in a manner representative of the additional information or can comprise a plurality of components of different frequency and, in some cases, one or more of these components can be modulated to convey still further information. An example of a wired broadcasting system of this kind is shown in FIGURE 4 and this embodiment of the invention provides facilities for obtaining an indication not only of the number of receiving equipments being used in respect of a particular television transmission but also of an audience characteristic, namely the number of viewers who are accepting the particular transmission by way of said equipments.

The system shown in FIGURE 4 is similar to that of FIGURE 1 in so far as it includes the sources 10 and 11 of modulated carrier waves pertaining to different television programmes and signal-distributing lines 12 and 13 respectively for conveying these carrier waves to a group of subscribers' receiving equipments. One such equipment is indicated, in block form, at 61 and another, which is shown in greater detail, will be seen to comprise, in common with the equipment shown in FIGURES 1 and 2, a television receiver 14, a programme selecting switch 15 and an electric mains supply switch 19. Personal operation of the switch 19 at random to bring the receiver 14 into use also brings about the energisation of a power unit 62, for the signal-generating means of this equipment, and the starting-up of a synchronous electric motor 63. The latter drives a switch-actuating cam 64 through a speed reducing gear box 65 so that said cam makes one complete rotation every three minutes and during each rotation closes a pair of contacts 66 to cause a short D.C. pulse to be applied to a differentiating circuit 67, the necessary D.C. current being obtained from the power unit 62. This D.C. pulse is applied to a monostable multivibrator 68 to produce a 36 millisecond pulse which is used to open and maintain open for the duration of this pulse a gate circuit 69. An oscillator 70 which is energised by the power unit 62 operates at 20 kc./s. and when the gate circuit is open it allows a 20 kc./s. impulse to pass from this oscillator through an unbalance-to-balance transformer 71 and a bandpass (20 kc./s.–30 kc./s.) filter 72 to the poles of the switch 15 and hence to the particular line to which this switch is set. This 20 kc./s. 30 millisecond impulse is one component of the popularity signal and is representative of the fact that this particular receiving equipment is "on" and receiving the programme pertaining to the line by which the signal arrives at the central station.

The motor 63 also drives, through the gear box 65 a wiper 73 of a six-segment distributor 74 at a speed such that one complete wipe of this distributor is made every 36 milliseconds. Each of the distributor segments is connected to a separate one of a group of seven fixed contacts of a switch 75, the remaining contact, 76, being connected to an oscillator 77 which is energised by the power unit 62 and operates at 30 kc./s. A shorting strip 78 of the switch 75 is arranged and adapted to be rotated by a knob 79 in order that a user of the equipment can connect the contact 76 with one or more of the remaining six contacts and therefore with a corresponding number of segments of the distributor. The number of such contacts so connected corresponds to the number of persons (up to six) receiving a programme by way of the equipment. It will be seen that during each of the 36 millisecond periods when the gate circuit 69 is open the distributor 74 will connect the oscillator 77 to this gate circuit and hence to the poles of the switch 15 a certain number of times dependent upon the setting of the switch 75. Accordingly there can be applied to the signal distributing line for transmission to the central station a number of 30 kc./s. impulses which is representative of the number of persons receiving the programme by way of this specific equipment, these 30 kc./s. impulses constituting another component of the popularity signal for operating an indicating apparatus at the central station.

In some cases it may be desirable to provide the distributor with more than six segments and have a corresponding greater number of contacts on the switch 75 in order to enable signal components representative of more than six persons to be produced.

The central station equipment comprises two indicating apparatus 80, which are connected to the lines 12 and 13 respectively through a 20 kc./s. bandpass filter 81, and two indicating apparatus 82 which are connected to the lines 12 and 13 respectively through a 30 kc./s. bandpass filter 83. All four indicating apparatus can be of the kind more particularly described with reference to FIGURE 1, those operating in respect of the 20 kc./s. impulses serving to give an indication of the number of receiving equipments being used and connected to the particular line, whilst the other two, which operate in respect of the 30 kc./s. impulses, present an indication of the number of persons receiving the programme by way of the said equipments and the particular line.

In applying the invention to radio broadcasting systems, telephone or other suitable lines can be adopted as signal-transmitting channels for the popularity signals. One such arrangement is shown, by way of example, in FIGURE 5 where a central station equipment includes four indicating apparatus 84, 85, 86 and 87 and associated filters 88 (20 kc./s.), 89 (25 kc./s.), 90 (30 kc./s.) and 91 (35 kc./s.) respectively are connected to each of a group of receiving equipments by a separate telephone line. One such equipment is shown, in block form, at 92 and is connected to the indicating apparatus by way of telephone lines 93. Another telephone line, 94, serves to connect the indicating apparatus with another such receiving equipment which is shown in greater detail and comprises a radio television receiver 95 which receives input signals by way of an antenna 96 and is adapted to be energised from electric power supply mains through the intermediary of a mains switch 97. It will be seen from the drawing that this equipment also comprises a number of elements which are counterparts of the signal-generating means hereinbefore described with reference to FIGURE 4, namely a power unit 62, synchronous motor 63, cam 64, gear box 65, contacts 66, differentiating circuit 67, multivibrator 68, gate circuit 69, oscillator 70 (20 kc./s.), unbalance-to-balance transformer 71 and a filter 72. The power unit 62 and the motor 63 are arranged to be energised from a supply mains by way of the switch 97 so that personal operation of this switch at random, to bring the receiver 95 into use, also brings about the energisation of the power unit 62 and the motor 63. The latter then operates, in the manner described with reference to FIGURE 4, to produce from the multivibrator 68 a 36 millisecond pulse which is used to open and maintain open for the duration of this pulse the gate circuit 69 which, for as long as this gate is open, allows a 20 kc./s. impulse to pass from the oscillator 70 through the filter 72 and hence to the telephone line 94 for transmission to the indicating apparatus at the central station. This 20 kc./s. 36 millisecond impulse is one component of the popularity signal and is representative of the fact that this particular receiving equipment is "on."

This signal-generating means also includes other counterparts of the arrangement shown in FIG. 4 namely, a wiper 73 of a distributor 74 and a switch 75, but in this modified arrangement the contact 76 is connected to the pole of a single-pole three-way switch 98 which preferably is ganged to the channel-selection switch 99 of the receiver 95 or, alternatively, can be personally operated to follow the movements of said switch 99 so that, when the latter is set to receive any one of the three predetermined different television transmissions, the switch 98 serves to connect said contact 76 with a predetermined one of three oscillators 100, 101 and 102 which are energised by the power unit 62 and operate at different frequencies, for example 25 kc./s., 30 kc./s. and 35 kc./s. respectively. Each of these three different frequencies is representative of a different one of the three predetermined transmissions. For the position of the switch 98 shown on the drawings, it will be seen that during each of the 36 millisecond periods when the gate circuit 69 is open, the distributor 74 will connect the oscillator 102 to the gate circuit and hence to the telephone line 94 a certain number of times dependent upon the setting of the switch 75. Accordingly, there can be applied to the telephone line for transmission to the indicating apparatus a number of 35 kc./s. impulses which is representative of the number of persons (up to six) which are using this specific equipment to receive the transmission pertaining to the channel to which the channel-selection switch 99—and therefore the switch 98—has been set. These 35 kc./s. impulses constitute another component of the popularity signal and in due course will be selected by the 35 kc./s. filter 91 for use in controlling the indicating apparatus 87. When the switches 98 and 99 are set at either of the other two channel positions, the oscillator 100 or 101 will be brought into use to bring about the production, in similar manner, the required signals of 25 kc./s. or 30 kc./s. as the case may be for transmission to the central station and selection by the appropriate filter (89 or 90) for use with the indicating apparatus 85 or 86 respectively. Thus there is made available every three minutes at the central station an indication, by apparatus 84, of the total number of the group of receiving equipments which are "on," and indications by the apparatus 85, 86 and 87 of the number of persons viewing the three respective television programmes.

In any of the receiving equipments herein described and using a synchronous electric motor as the time-controlling element of the signal-generating means, this motor can operate a clock display for the use of the subscriber. Alternatively or in addition this motor can drive a mechanism for giving an indication of the total operating time of the receiving equipment.

In other embodiments, the synchronous motor used in the signal-generating means can be replaced by an electronic valve or transistor circuit which is arranged and adapted to control the duration of the popularity signals.

Instead of using a separate indicating apparatus in respect of each item of information it is desired to indicate, one such apparatus can be arranged for use, on a time sharing basis, to produce indications in respect of different information. An arrangement of this kind is shown in FIGURE 6 where a single indicating apparatus 103 is shared between two lines 104 and 105 which distribute signals from different programme sources 106 and 107 respectively. A change-over switch 108 under the control of a timing mechanism 109 functions to switch the apparatus to each line alternately for a period sufficient to enable it to respond satisfactorily to the popularity signals on the line.

Another time sharing arrangement is shown in FIGURE 7. In this case a wired broadcasting network comprises spur lines 110 and 111 both of which serve to distribute the same programme signals from a source 112. Each spur line feeds programme signals to a separate group of receiving equipments provided with popularity signal-generating means and a single indicating apparatus 113 is shared between these two lines by providing a change-over switch 114 which, under the control of a timing mechanism 115, switches the apparatus to each spur line alternately for a suitable period of time.

There is shown in FIGURE 8, a typical form of receiving equipment for use in a wired broadcasting system according to the invention and pertaining to television programmes. This equipment comprises a table 116 which provides accommodation for a television receiver 117 and, beneath the table top, a popularity signal-generating unit 118. A mains supply lead 119 enters this unit and, under the control of a mains switch 120, supplies electric power for energising the said unit and also the receiver. A quad cable 121, which has its pairs of conductors connected to separate lines of the wired broadcasting network respectively, enters this unit and a programme selection switch 122 serves to connect the input circuit of the receiver to either of these pairs of conductors according to which programme is required. A further switch, 123, is provided for adjusting the signal-generating means so that it produces, in the manner hereinbefore described, popularity signals in respect of the number of viewers using the receiver.

What I claim is:

1. In a broadcasting system which comprises a group of receiving equipments each adapted to receive at least one broadcast transmission, and a central station at which the number of said equipments conditioned to receive that one broadcast transmission is to be determined; the combination of a timing mechanism included in each of said receiving equipments and selectively operative to generate a succession of electric impulses which occur at substantially regular intervals and are of short duration relative to the interval of time between successive impulses, electric impulse counting apparatus at the central station operative to provide an indication of the number of said electric impulses applied thereto in each such interval of time, a signal transmitting channel between each receiving equipment and said counting apparatus, a personally-operable control for each receiving equipment operative, in a set position thereof, to condition the related receiving equipment to receive said one broadcast transmission and, simultaneously, to apply the succession of electric impulses from the related timing mechanism to the related signal transmitting channel and hence to said counting apparatus, whereby the latter counts the number of electric impulses applied thereto from said group of receiving equipments during each of said intervals of time and thereby indicates the number of receiving equipments in said group which are conditioned to receive said one broadcast transmission.

2. In a broadcasting system, the combination as in claim 1; wherein said timing mechanism for generating a succession of electric impulses is electrically driven, and said personally-operable control includes switching means which, in said set position of the control, operates to effect energization of the related electrically driven timing mechanism.

3. In a broadcasting system, the combination as in claim 1, wherein each of said receiving equipments includes a source of high frequency electric wave energy, and said electric impulses generated by each timing mechanism are of said high frequency electric wave energy from said source of the related receiving equipment.

4. In a broadcasting system which comprises a group of receiving equipments each adapted to receive a selected one of a plurality of broadcast transmissions, and a central station at which the numbers of said receiving equipments conditioned to receive the broadcast transmissions is to be determined, the combination of a signal generating means for each of said group of receiving equipments including a timing mechanism selectively operative to generate a succession of electric impulses which occur at substantially regular intervals and are of short duration relative to the interval of time between successive impulses, an electric impulse counting apparatus at said central station, signal transmitting channels respectively corresponding to the different broadcast transmissions and extending between each of said receiving equipments and said counting apparatus, a personally-operable control for each of said receiving equipments operative, when in a set position thereof, to condition the related receiving equipment to receive a selected one of the broadcast transmissions and to cause the signal transmitting channel corresponding to the received broadcast transmission to convey said succession of electric impulses from the related receiving equipment to said counting apparatus, said counting apparatus being operative to count the number of said electric impulses applied thereto over each of said signal transmitting channels during each of said intervals of time, thereby to indicate the number of said receiving equipments of said group which are conditioned to receive each of said broadcast transmissions.

5. In a broadcasting system, the combination as in claim 4; wherein said electric impulse counting apparatus at the central station includes a plurality of electric impulse counting devices respectively corresponding to said broadcast transmissions and connected to the respective signal transmitting channels to individually indicate the number of said electric impulses received by way of the respective signal transmitting channels.

6. In a broadcasting system comprising a group of receiving equipments each operative to receive a selected one of a plurality of broadcast transmissions, and a central station at which the numbers of said receiving equipments conditioned to receive each of the broadcast transmissions is to be determined; the combination of a personally-operable control forming part of each of said receiving equipments and selectively operable to condition the related equipment to receive any one of the broadcast transmissions, a timing mechanism included in each of said receiving equipments and operative, under the control of said personally-operable control, to generate a succession of electric impulses of distinctive form corresponding to the broadcast transmission then being received by the related receiving equipment, said electric impulses occurring at substantially regular intervals and being of short duration in relation to the interval of time between successive impulses, electric impulse counting apparatus at said central station operative to indicate the number of each of said distinctive electric impulses applied thereto during each of said intervals of time, and a signal transmitting channel between each of said receiving equipments and said counting apparatus for conveying said electric impulses from the related receiving equipments to said counting apparatus so that the latter counts the number of each of said distinctive electric impulses applied thereto by way of the signal transmitting channels and thereby indicates the number of said receiving equipments of the group which are conditioned to receive each of the broadcast transmissions.

7. In a broadcasting system which comprises a group of receiving equipments each operative to receive a broadcast transmission, and a central station; the combination of a timing mechanism forming part of each of said receiving equipments and selectively operable to generate a succession of electric impulses which occur at substantially regular intervals and are of short duration in relation to the interval of time between successive impulses, a personally-operable switch for each receiving equipment capable of being set to a selected one of a plurality of different positions each representing a predetermined different number of persons who are accepting a broadcast transmission through the related receiving equipment, means controllable by said switch to render said electric impulses generated by the related timing mechanism distinctive for each of the different positions of said switch, an electric impulse counting apparatus at said central station operative to indicate the number of each of said distinctive electric impulses applied thereto in each of said intervals of time, a signal transmitting channel between each of said receiving equipments and said counting apparatus, and personally-operable control means for each of said receiving equipments actuable to condition the related equipment to receive the broadcast transmission and acting on said switch to position the latter for directing the succession of electric impulses pertaining to the use of the related equipment and the number of persons accepting the transmission by way of said equipment through said signal transmitting channel to said counting apparatus at the central station so that said counting apparatus counts the number of each of said distinctive electric impulses applied thereto in each of said intervals of time and thereby indicates the total number of persons receiving the broadcast transmission through said group of receiving equipments.

8. In a broadcasting system, the combination of a group of receiving equipments each including a signal generating means, a plurality of signal distributing lines, a source of different program signals coupled to each of said lines so that each of the latter serves to distribute a separate broadcast program, a personally-operable switch included in each of said receiving equipments and operative to couple the latter to a selected one of said lines in order to receive the broadcast program being distributed thereby, said signal generating means of each of said receiving equipments including a timing mechanism selectively operable to generate a succession of electric impulses which occur at substantially regular intervals and are of short duration in relation to the interval of time between successive impulses, said switch further being operative to apply said electric impulses to a selected one of said lines corresponding to the broadcast program being received, and electric impulse counting means at a central station connected to said lines and indicating the numbers of said electric impulses received by way of each of said lines within each interval of time, thereby indicating the number of receiving equipments of said group which are receiving each of the different broadcast programs.

9. In a broadcasting system, the combination as in claim 8, wherein said timing mechanism is electrically driven, and further comprising a personally-operable switch for controlling the energization of the related receiving equipment and said electrically driven timing mechanism.

10. In a broadcasting system, the combination as in claim 8, wherein said signal generating means for each of said receiving equipments includes a source of high frequency electric wave energy, and said timing mechanism generates the related succession of impulses from said high frequency electric wave energy.

References Cited in the file of this patent

UNITED STATES PATENTS

| | | |
|---|---|---|
| 2,188,165 | Thomas | Jan. 23, 1940 |
| 2,465,976 | Goldsmith | Mar. 29, 1949 |
| 2,630,366 | Rahmel | Mar. 3, 1953 |
| 2,652,310 | Scherbatskoy | Sept. 15, 1953 |
| 2,755,162 | Krahulec | July 17, 1956 |
| 2,864,941 | Currey | Dec. 16, 1958 |